United States Patent
Kalhan et al.

(10) Patent No.: US 12,010,580 B2
(45) Date of Patent: Jun. 11, 2024

(54) METHOD OF INFORMING SERVING CELL OF UPLINK INTERFERENCE AT NEIGHBOR CELL CAUSED BY UNMANNED AERIAL VEHICLE

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 18/221,257

(22) Filed: Jul. 12, 2023

(65) Prior Publication Data

US 2023/0362771 A1    Nov. 9, 2023

Related U.S. Application Data

(63) Continuation of application No. 17/718,519, filed on Apr. 12, 2022, now Pat. No. 11,778,532, which is a
(Continued)

(51) Int. Cl.
*H04W 72/08* (2009.01)
*H04W 24/10* (2009.01)
(Continued)

(52) U.S. Cl.
CPC ........... *H04W 36/20* (2013.01); *H04W 24/10* (2013.01); *H04W 36/0058* (2018.08);
(Continued)

(58) Field of Classification Search
None
See application file for complete search history.

(56) References Cited

U.S. PATENT DOCUMENTS 11,337,128 B2 *  5/2022  Kalhan ............. H04W 36/0085
2008/0014957 A1   1/2008  Ore
(Continued)

FOREIGN PATENT DOCUMENTS

| WO | 2013009232 A1 | 1/2013 |
| WO | 2013049505 A1 | 4/2013 |
| WO | 2015115983 A1 | 8/2015 |

OTHER PUBLICATIONS

NTT Docomo; "Initial views on potential problems and solutions for aerial vehicles," R1-1708433; May 5, 2017; 3GPP TSG RAN WG#1 89; Hangzhou, CN.

*Primary Examiner* — Gary Lafontant

(57) ABSTRACT

A neighboring cell determines that uplink interference from an unmanned aerial vehicle (UAV) exceeds a first threshold at the neighboring cell. The neighboring cell transmits an uplink interference indicator to the UAV. In some examples, the UAV informs its serving cell of the uplink interference experienced by the neighboring cell. The serving cell can utilize information received from the UAV to make handover decisions or scheduling decisions for the UAV that caused the uplink interference. In other examples, the UAV can temporarily refrain from transmitting on at least some of its uplink resources or utilize different uplink resources for uplink data transmissions. In still other examples, the UAV can utilize downlink measurements to select which neighboring base station System Information Block messages should be monitored for an uplink interference indicator.

7 Claims, 10 Drawing Sheets

Related U.S. Application Data continuation of application No. 16/636,864, filed as application No. PCT/US2018/046190 on Aug. 10, 2018, now Pat. No. 11,337,128.

(60) Provisional application No. 62/683,381, filed on Jun. 11, 2018, provisional application No. 62/571,976, filed on Oct. 13, 2017, provisional application No. 62/544,191, filed on Aug. 11, 2017.

(51) Int. Cl.
| | |
|---|---|
| *H04W 36/00* | (2009.01) |
| *H04W 36/08* | (2009.01) |
| *H04W 36/20* | (2009.01) |
| *H04W 36/38* | (2009.01) |
| *H04W 48/10* | (2009.01) |
| *H04W 72/23* | (2023.01) |
| *H04W 72/541* | (2023.01) |
| *H04W 88/02* | (2009.01) |

(52) U.S. Cl.
CPC ... *H04W 36/0061* (2013.01); *H04W 36/0072* (2013.01); *H04W 36/00837* (2018.08); *H04W 36/08* (2013.01); *H04W 36/38* (2013.01); *H04W 48/10* (2013.01); *H04W 72/23* (2023.01); *H04W 72/541* (2023.01); *H04W 88/02* (2013.01)

(56) References Cited

U.S. PATENT DOCUMENTS

| | | |
|---|---|---|
| 2009/0109939 A1 | 4/2009 | Bhushan et al. |
| 2012/0252524 A1 | 10/2012 | Gora et al. |
| 2014/0269565 A1 | 9/2014 | Chou |
| 2015/0264640 A1 | 9/2015 | Feng et al. |
| 2018/0375568 A1 | 12/2018 | De Rosa et al. |
| 2019/0149384 A1 | 5/2019 | Kim et al. |
| 2020/0236684 A1 | 7/2020 | Hong |

* cited by examiner

METHOD OF INFORMING SERVING CELL OF UPLINK INTERFERENCE AT NEIGHBOR CELL CAUSED BY UNMANNED AERIAL VEHICLE

CLAIM OF PRIORITY

The present application is a continuation of and claims priority to U.S. application Ser. No. 17/718,519, entitled "METHOD OF INFORMING SERVING CELL OF UPLINK INTERFERENCE AT NEIGHBOR CELL CAUSED BY UNMANNED AERIAL VEHICLE" and filed on Apr. 12, 2022; which is a continuation of and claims priority to U.S. application Ser. No. 16/636,864, entitled "METHOD OF INFORMING SERVING CELL OF UPLINK INTERFERENCE AT NEIGHBOR CELL CAUSED BY UNMANNED AERIAL VEHICLE" and filed on Feb. 5, 2020; which is a national stage application of PCT/US2018/046190, entitled "METHOD OF INFORMING SERVING CELL OF UPLINK INTERFERENCE AT NEIGHBOR CELL CAUSED BY UNMANNED AERIAL VEHICLE" and filed on Aug. 10, 2018; which claims priority to U.S. Provisional Application No. 62/544,191 filed on Aug. 11, 2017; U.S. Provisional Application No. 62/683,381 filed on Jun. 11, 2018; and U.S. Provisional Application No. 62/571,976 filed on Oct. 13, 2017; all of which are assigned to the assignee hereof and hereby expressly incorporated by reference in their entirety.

FIELD

This invention generally relates to wireless communications and more particularly to mitigating interference caused by unmanned aerial vehicles.

BACKGROUND

Aerial vehicles (AVs), such as drones, have received increasing interest in the past few years. AVs can be used to perform many different applications, including package delivery, real-time imaging, video surveillance, solar farm inspection, fire and storm assessment, search-and-rescue, monitoring of critical infrastructure, and wildlife conservation. Many of these emerging use cases could benefit from connecting the AV to a cellular network as a user equipment (UE) device.

SUMMARY

A neighboring cell determines that uplink interference from an unmanned aerial vehicle (UAV) exceeds a first threshold at the neighboring cell. The neighboring cell transmits an uplink interference indicator to the UAV. In some examples, the UAV informs its serving cell of the uplink interference experienced by the neighboring cell. The serving cell can utilize information received from the UAV to make handover decisions or scheduling decisions for the UAV that caused the uplink interference. In other examples, the UAV can temporarily refrain from transmitting on at least some of its uplink resources or utilize different uplink resources for uplink data transmissions. In still other examples, the UAV can utilize downlink measurements to select which neighboring base station System Information Block messages should be monitored for an uplink interference indicator.

DETAILED DESCRIPTION

Figure 1:
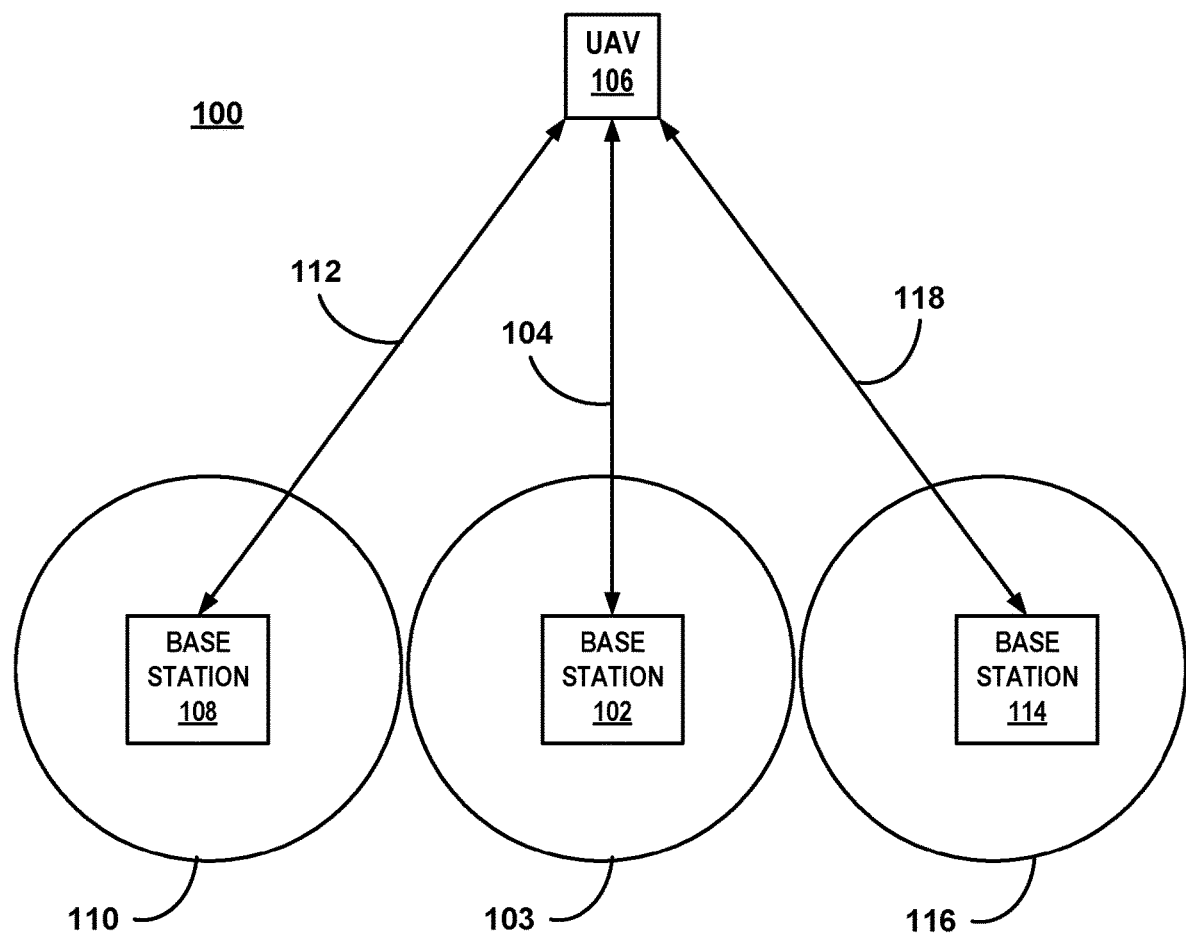
FIG. 1 is a block diagram of a system for an example in which uplink interference from an unmanned aerial vehicle (UAV) exceeds a first threshold at a neighboring cell.

There are a number of important considerations when connecting an unmanned aerial vehicle (UAV) to a network as a user equipment (UE) device. One example of a network to which the UAV can be connected is a 3rd Generation Partnership Project (3GPP) Long-Term Evolution (LTE) network. In other examples, the network is a fifth generation wireless system (5G) New Radio network. Regardless of the particular network to which the UAV connects, enhancements may be identified to better prepare the cellular networks for the data traffic growth from UAVs, such as drones, in the coming years.

When the UAV is flying well above a base station (eNB) antenna height, the uplink signal, which is transmitted from the UAV, may be received by multiple cells (e.g., base stations) due to line-of-sight propagation conditions. Thus, the likelihood of the uplink signal from the UAV causing interference to neighboring cells increases as the altitude of the UAV increases. In the scenarios in which the uplink signals from the UAV are considered to be interference to one or more neighboring cells, the interference gives a negative impact to the UE devices on the ground (e.g., smartphones, Internet of Things (IoT) devices, etc.).

To prevent such uplink interference, one or more cells that are not providing services to the UAV may vary their antenna beam patterns to steer away from the interfering UAV. In addition, the cell that is providing services to the UAV (e.g., serving cell or serving base station) may steer its antenna beam pattern towards the UAV. However, such antenna steering mechanisms are complicated and may impact services to terrestrial UE devices.

Due to uplink interference experienced by neighboring cells, it is important that the UAV's serving cell accounts for such interference during handovers. For example, the serving cell could handover the UAV to a neighboring cell that has the smallest uplink pathloss so that the UAV's transmit power may be minimized, which will also minimize uplink interference to neighboring cells. In other cases, the UAV's serving cell may try to allocate uplink resources not used by neighboring cells to avoid uplink interference.

However, in both cases, tight network coordination is needed, which may not be readily available today or in the foreseeable future. In some cases, network coordination may not even be possible due to the lack of backhaul link among cells (e.g., no X2 links), but without neighbor cell information, it is difficult for the serving cell to optimize the handover or allocate orthogonal resources to the UAV.

Based on the above observations, there is a need for the serving cell to be informed of the neighbor cells' uplink interference condition without tight network coordination. Some of the examples described herein include a method and a system for informing the serving cell of the neighbor cells' uplink interference condition via the UAV to solve the above problems. In other examples, the UAV takes action to mitigate interference at the neighboring cells without involving the serving cell.

FIG. 1 is a block diagram of a communication system for an example in which uplink interference from an unmanned aerial vehicle (UAV) exceeds a first threshold at a neighboring cell. The communication system 100 is part of a radio access network (not shown) that provides various wireless services to UE devices that are located within the respective service areas of the various base stations that are part of the radio access network. Base station 102 is connected to the network through a backhaul (not shown) in accordance with known techniques. The base station 102 provides wireless services to UAV 106, which functions as a UE device in the examples herein. The base station 102 communicates with UAV 106 via communication link 104.

Although the UAV 106 is located above service area 103 of the base station 102 in FIG. 1, base station 102, in this example, is the serving base station for the UAV 106. For example, although the service areas 103, 110, 116 are shown as two-dimensional areas in FIG. 1, it is understood that for purposes of providing services to a UAV, the service areas actually extend upwards vertically to provide services to UAVs that may be located at various altitudes above the service areas shown in FIG. 1. Specifically, the determination of which base station is used to serve the UAV 106 in the Connected mode is controlled by the network according to multiple factors such as loading of the neighboring base stations, the base station antenna configurations, and the downlink signal strength measurements reports from the UAV 106. In this regard, it is worth noting that, similar to the coverage area that can be provided to traditional, terrestrial UE devices by a base station, the coverage area that can be provided to a UAV by a base station can also be affected by distance, environmental conditions, obstructions, and interference.

In the example shown in FIG. 1, communication link 104 is a Uu link between the UAV 106 and the base station (eNB) 102. Communication link 104 is configured to provide downlink communication from the base station 102 to the UAV 106 and to provide uplink communication from the UAV 106 to the base station 102.

In the interest of clarity and brevity, communication system 100 is shown as having only two neighboring base stations 108, 114, which provide wireless services to UE devices located within their respective service areas 110, 116. However, in other examples, communication system 100 could have any suitable number of base stations. In the example shown in FIG. 1, base station 102 is considered to be a serving base station since it is providing wireless services to UAV 106. However, neighboring base stations 108, 114 are also capable of providing wireless services to the UAV 106 via their respective communication links 112, 118, if the UAV 106 is handed over to one of the neighboring base stations 108, 114. Communication links 112, 118 are similar to communication link 104. If, for example, the UAV 106 is handed over to neighboring base station 108, then neighboring base station 108 would become the serving base station, and base station 102 would become a neighboring base station. For the purposes of the examples described herein, base stations are considered to be neighboring each other if they are relatively close to each other and/or the UAV 106 can simultaneously receive signals from each of the neighboring base stations at a given time.

Base station 102, which is sometimes referred to as an eNodeB or eNB, communicates with the UAV 106 by transmitting downlink signals via communication link 104. In the case of 5G based on New Radio, the base station is sometimes referred to as a gNB. Base station 102 also receives uplink signals transmitted from the UAV 106 via communication link 104. As used herein, the terms "base station" and "cell" are interchangeable. In some cases, the serving cell is provided by a first base station, and the neighboring cell is provided by a second base station. However, in other cases, a serving cell and a neighboring cell may be provided by the same base station.

Although FIG. 2A specifically depicts the circuitry and configuration of serving base station 102, the same base station circuitry and configuration that is shown and described in connection with serving base station 102 is also utilized for neighboring base stations 108, 114 in the example shown in FIG. 1. In other examples, either of the base stations may have circuitry and/or a configuration that differs from that of the serving base station 102 shown in FIG. 2A.

Figure 2A:
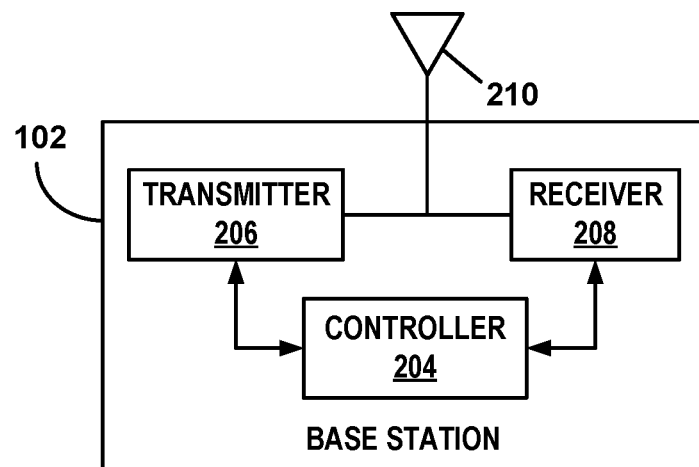
FIG. 2A is a block diagram of an example of the base stations shown in FIG. 1.

As shown in FIG. 2A, base station 102 comprises controller 204, transmitter 206, and receiver 208, as well as other electronics, hardware, and code. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the downlink signals to be transmitted via communication link 104 and, in so doing, can apply any one of a plurality of modulation orders. The demodulator demodulates any uplink signals received at the base station 102 in accordance with one of a plurality of modulation orders.

Returning to FIG. 1, the communication system 100 provides various wireless services to the UAV 106 via base station 102. For the example shown in FIG. 1, the communication system 100 operates in accordance with at least one revision of the 3rd Generation Partnership Project (3GPP) communication specification. In the example shown in FIG. 2B, the UAV 106 circuitry is configured to communicate directly with the base station 102. For example, the UAV 106 receives downlink signals via communication link 104 using antenna 212 and receiver 214. The UAV 106 transmits uplink signals using transmitter 218 and antenna 212.

Besides antenna 212 and receiver 214, the UAV 106 further comprises controller 216 and transmitter 218, as well as other electronics, hardware, and code. The UAV 106 is any fixed, mobile, or portable equipment that performs the functions described herein. The various functions and operations of the blocks described with reference to the UAV 106 may be implemented in any number of devices, circuits, or elements. Two or more of the functional blocks may be integrated in a single device, and the functions described as performed in any single device may be implemented over several devices.

For the examples described herein, the UAV 106 is any wireless communication device that is capable of flight without having a human pilot aboard. In some examples, UAV 106 may be connected to an Evolved Universal Mobile Telecommunications System Terrestrial Radio Access Network (E-UTRAN) when flying and when on the ground. A drone would be one example of UAV 106. In the instances where the UAV 106 is a drone, the flight of the UAV 106 may operate with various degrees of autonomy, either under remote control by a human operator, autonomously by an onboard computer, or autonomously by a remote computer. In other cases, the UAV 106 may be a kite whose height can be manually adjusted by a human operator. In still other cases, the UAV 106 may be a kite whose height can be adjusted by an adjustable mechanized tether, which can be controlled by a human operator, by a programmed algorithm, or by the UAV 106 itself.

The controller 216 of the UAV 106 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

Figure 2B:
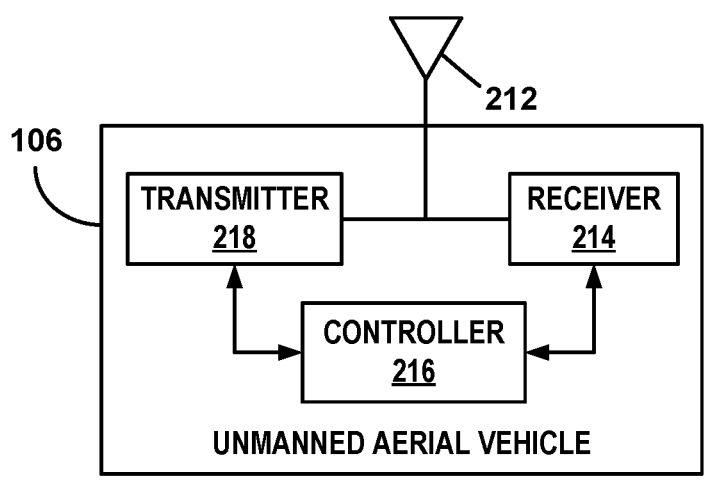
FIG. 2B is a block diagram of an example of the UAV shown in FIG. 1.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device (e.g., UAV 106).

The transmitter 218 includes a modulator (not shown), and the receiver 214 includes a demodulator (not shown). The modulator can apply any one of a plurality of modulation orders to modulate signals prior to transmission. The demodulator demodulates received signals in accordance with one of a plurality of modulation orders.

In operation, serving base station 102 provides wireless services to (e.g., serves) UAV 106 via communication link 104. However, due to the altitude at which the UAV 106 operates, the uplink transmissions from the UAV 106 may cause interference with one or more neighboring base stations 108, 114. More specifically, the uplink data transmissions from UAV 106 may interfere with the uplink data transmissions being transmitted by UE devices (not shown in FIG. 1) located within the respective service areas 110, 116 of the neighboring base stations 108, 114. As mentioned above, some of the examples described herein include a method and a system for informing the serving cell 102 of the neighbor cells' uplink interference condition via the UAV 106 to solve interference problems caused by the UAV 106. In other examples, the UAV 106 takes action to mitigate interference at the neighboring cells 108, 114 without involving the serving cell 102.

FIGS. 3A-3D depict the signals that are transmitted between the UAV 106, the serving base station 102, and a neighboring base station 108, according to several different examples in which the UAV 106 is informed of the uplink interference condition of neighboring base station 108. In the interest of clarity and brevity, not all of the messages that are transmitted between the UAV 106 and the base stations 102, 108 are included in FIGS. 3A-3D. Moreover, one or more of the messages that are shown in FIGS. 3A-3D may be omitted. Likewise, additional messages may be included beyond those shown in FIGS. 3A-3D that facilitate the mitigation of uplink interference experienced by the neighboring base station 108. Furthermore, the various signals shown in FIGS. 3A-3D may be combined with each other and/or substituted in any suitable manner that facilitates the mitigation of uplink interference experienced by the neighboring base station 108.

Figure 3A:
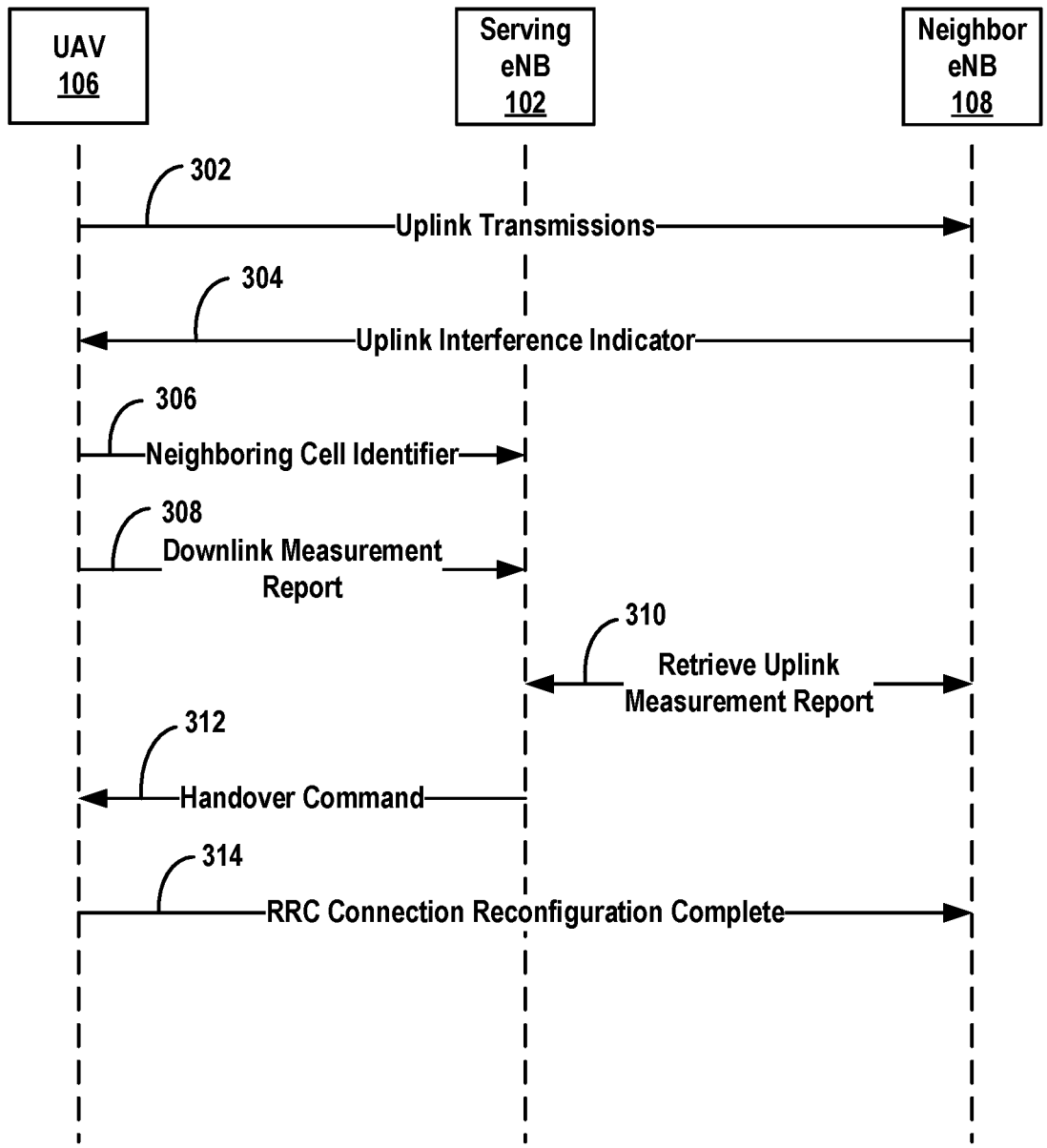
FIG. 3A is a messaging diagram of an example in which a serving cell makes a handover decision for the UAV in response to the UAV causing excessive uplink interference at a neighboring cell.

FIG. 3A is a messaging diagram of an example in which a serving cell 102 makes a handover decision for the UAV 106 in response to the UAV 106 causing excessive uplink interference at a neighboring cell 108. The handover decision for UAV 106 may have a profound impact on the severity of uplink interference due to the differences in the transmit power of the UAV 106 towards the selected target cell 108 for handover. In order for the serving cell 102 to make the proper handover decision, the serving cell 102 needs to know the extent of the uplink interference towards the neighboring cell(s) 108, 114. In some cases, the neighboring cell 108 that experiences the worst uplink interference may be the best target cell for handover. FIG. 3A depicts the messages that are exchanged between the UAV 106 and the base stations 102, 108 to make an informed handover decision.

In the example shown in FIG. 3A, the UAV 106 transmits, via transmitter 218 and antenna 212, uplink transmissions that are intended for the serving cell (e.g., base station) 102. However, these uplink transmissions create unintended interference at neighboring cell (e.g., base station) 108. The base stations 102, 108 receive the uplink transmissions via their respective antennas 210 and receivers 208. The signal containing the uplink transmissions is represented in FIG. 3A by signal 302. In other examples, UAV 106 may transmit a Sounding Reference Signal (SRS) or a signal on the Physical Random Access Channel (PRACH) for uplink detection at the neighboring base station 108. The SRS and the PRACH signal can be configured by the serving cell 102.

Upon receipt of the uplink transmissions 302 from the UAV 106, the controller 204 of neighboring base station 108 determines whether the uplink transmissions 302 received from the UAV 106 are causing a level of interference at the neighboring cell 108 that exceeds an interference threshold. If the interference caused by the uplink transmissions 302 exceeds the interference threshold, the neighboring base station 108 transmits, via its transmitter 206 and antenna 210, an uplink interference indicator to the UAV 106. The UAV 106 receives the uplink interference indicator with antenna 212 and receiver 214. The signal containing the uplink interference indicator is represented in FIG. 3A by signal 304.

In some cases, the neighboring cell 108 transmits the uplink interference indicator to the UAV 106 over a Multicast-Broadcast Single Frequency Network (MBSFN) channel. In other cases, the neighboring cell 108 transmits the uplink interference indicator to the UAV 106 over a System Information Block (SIB).

In some examples, the uplink interference indicator includes an identifier of the neighboring cell 108. For example, the identifier of the neighboring cell 108 may be a Physical Cell Identifier (PCI) associated with the neighboring cell 108. In other examples, the uplink interference indicator comprises a location of uplink radio resources where the uplink interference occurred.

In still other examples, the uplink interference indicator comprises a multiple threshold indicator comprising one or more bits. For example, if the neighboring cell 108 is configured to compare the uplink interference with multiple interference thresholds, each of which is indicative of a different level of uplink interference being experienced by the neighboring cell 108, the uplink interference indicator could be set to reflect one of the multiple thresholds that is representative of the level of uplink interference being experienced by the neighboring cell 108. More specifically, a 1-bit uplink interference indicator could be used to represent 2 different interference thresholds, and a 2-bit uplink interference indicator could be used to represent 4 different interference thresholds.

Upon receipt of the uplink interference indicator, the controller 216 of the UAV 106 determines that the uplink interference indicator is addressed to the UAV 106 based on the timing of the uplink transmissions from the UAV 106 and the timing of the reception of the uplink interference indicator. However, in other examples, identifiers for any UAVs operating in the area may be shared among nearby cells so that the neighboring cell 108 can identify the interfering UAV 106. Thus, in these examples, the uplink interference indicator may also include an identifier associated with the interfering UAV 106.

Upon determining that the uplink interference indicator is addressed to the UAV 106, the UAV 106 informs the serving cell 102 of the uplink interference experienced by the neighboring cell 108. For the example shown in FIG. 3A, the UAV 106 transmits, via transmitter 218 and antenna 212, a message, including the neighboring cell identifier, which was received with the uplink interference indicator, to the serving cell 102 to inform the serving cell 102 of the uplink interference experienced by neighboring cell 108. In some examples in which more than one neighboring cell 108, 114 is experiencing excessive uplink interference from the UAV 106, the UAV 106 only informs the serving cell 102 of the neighboring cell 108 with the worst uplink interference, as reflected by the multiple threshold interference indicators discussed above. The serving cell 102 receives, via its antenna 210 and receiver 208, the identifier of the neighboring cell 108. The signal containing the neighboring cell identifier is represented in FIG. 3A by signal 306. In other examples, the UAV 106 may inform the serving cell 102 of all or some of the neighboring cells 108, 114 that indicated that they were experiencing excessive uplink interference.

In some examples, the UAV 106 transmits, via transmitter 218 and antenna 212, the uplink interference indicator, along with or separate from the neighboring cell identifier, to the serving cell 102 to inform the serving cell 102 of the uplink interference experienced by the neighboring cell 108. The serving cell 102 receives, via its antenna 210 and receiver 208, the uplink interference indicator. Receipt of the uplink interference indicator triggers the serving cell 102 to transmit, via its transmitter 206 and antenna 210, the uplink interference indicator in a System Information Block (SIB) message. By broadcasting the uplink interference indicator, which pertains to neighboring cell 108, in the serving cell 102, other UAVs will not need to monitor the System Information of the neighboring cell 108 to read the SIB messaging in order to find out if the neighboring cell 108 is broadcasting an uplink interference indicator. This broadcasting of the uplink interference indicator of the neighboring cell 108 by the serving cell 102 efficiently informs nearby UAVs whether the neighboring cell 108 is broadcasting an uplink interference indicator.

In other examples, the receiver 214 of the UAV 106 is configured to monitor System Information Block (SIB) messaging from the neighboring cell 108, in response to the controller 216 of the UAV 106 determining that a signal strength of a downlink signal received at the UAV 106 from the neighboring cell 108 exceeds a downlink signal strength threshold. For example, the UAV 106 could choose to read the SIB messages from only those neighboring base stations that have a downlink signal strength (e.g., Reference Signals Received Power (RSRP)) greater than a certain signal strength threshold measured at the UAV 106. This signal strength threshold could be defined by the network. In Frequency Division Duplex (FDD) deployments, the UAV 106 could assume that a neighboring base station 108 is receiving the uplink signal from the UAV 106 at a strength that is similar to the strength at which the UAV 106 is receiving the downlink signal from the same neighboring base station 108. In a Time Division Duplex (TDD) deployment, a simple downlink-uplink reciprocity is applied to determine the strength at which signals are being received between the UAV 106 and the neighboring base station 108.

Receipt of the uplink interference indicator also triggers the controller 216 of the UAV 106 to generate a downlink measurement report associated with downlink transmissions received by the UAV 106 from the neighboring cell 108 that sent the uplink interference indicator signal 304. In some examples, the UAV 106 generates a downlink measurement report that pertains to the uplink interference indicator signal 304 received from the neighboring cell 108, which may or may not have the highest downlink signal strength in a list of neighboring cells 108, 114. In other examples, the neighboring cell identifier is included with the downlink measurement report, if the neighboring cell identifier was not included in signal 306. The UAV 106 transmits, via transmitter 218 and antenna 212, the downlink measurement report to the serving cell 102. The serving cell 102 receives, via its antenna 210 and receiver 208, the downlink measurement report. The signal containing the downlink measurement report is represented in FIG. 3A by signal 308.

Upon receipt of the downlink measurement report, the controller 204 of the serving cell 102 determines whether UAV 106 should be handed over to neighboring cell 108 based on the contents of the uplink interference indicator (e.g., the neighboring cell identifier associated with the neighboring cell 108 that experienced the uplink interference) and the downlink measurement report associated with neighboring cell 108. In some examples, the serving cell 102 may also request an uplink measurement report from the neighboring cell 108 regarding the uplink signal strength associated with the UAV 106. The request for the uplink measurement report and the corresponding response are transmitted via a wired connection (e.g., X2) between the serving cell 102 and the neighboring cell 108 and are represented in FIG. 3A by signal 310.

If the UAV 106 should be handed over, the serving cell 102 transmits, via its transmitter 206 and antenna 210, a handover command to inform the UAV 106 to handover to the neighboring cell 108. The UAV 106 receives the handover command with antenna 212 and receiver 214. The signal containing the handover command is represented in FIG. 3A by signal 312.

Upon receipt of the handover command, the UAV 106 complies with the handover command to perform a handover procedure to neighboring cell 108. In order to complete the handover procedure, the UAV 106 transmits, via transmitter 218 and antenna 212, a Radio Resource Control (RRC) Connection Reconfiguration Complete message to the neighboring cell 108. The neighboring cell 108 receives the RRC Connection Reconfiguration Complete message with its antenna 210 and receiver 208. The signal containing the RRC Connection Reconfiguration Complete message is represented in FIG. 3A by signal 314. Once the handover procedure is complete, the neighboring cell 108 becomes the serving cell for the UAV 106, and the serving cell 102 becomes a neighboring cell for the UAV 106.

Figure 3B:
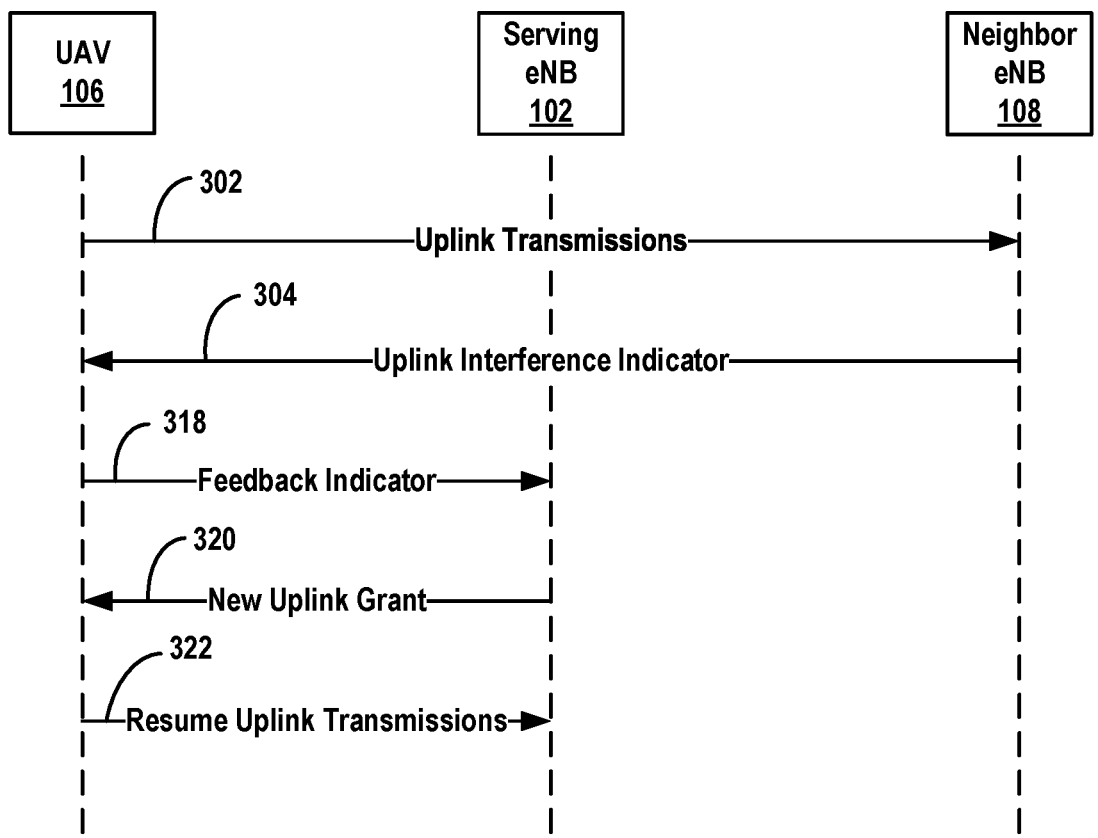
FIG. 3B is a messaging diagram of an example in which a serving cell makes a scheduling decision for the UAV in response to the UAV causing excessive uplink interference at a neighboring cell.

FIG. 3B is a messaging diagram of an example in which a serving cell 102 makes a scheduling decision for the UAV 106 in response to the UAV 106 causing excessive uplink interference at a neighboring cell 108. Besides using the uplink interference indicator to make handover decisions as shown above in connection with FIG. 3A, the uplink interference indicator may also be used for making scheduling decisions. For example, when a neighboring cell 108 experiences excessive uplink interference from the UAV 106, the neighboring cell 108 sends the uplink interference indicator to the UAV 106. The neighboring cell 108 may also include the location of the uplink radio resources where the interference occurred. When the UAV 106 receives the uplink interference indicator, the UAV 106 informs its serving cell 102 of this uplink interference, and the serving cell 102 has the option to reconfigure a different uplink radio resource to the UAV 106. FIG. 3B depicts the messages that are exchanged between the UAV 106 and the base stations 102, 108 so that the serving cell 102 can make an informed scheduling decision.

Initially, the UAV 106 transmits, via transmitter 218 and antenna 212, uplink transmissions that are intended for the serving cell (e.g., base station) 102. However, these uplink transmissions create unintended interference at neighboring cell (e.g., base station) 108. The base stations 102, 108 receive the uplink transmissions via their respective antennas 210 and receivers 208. The signal containing the uplink transmissions is represented in FIG. 3B by signal 302.

Upon receipt of the uplink transmissions 302 from the UAV 106, the controller 204 of neighboring base station 108 determines whether the uplink transmissions 302 received from the UAV 106 are causing a level of interference at the neighboring cell 108 that exceeds an interference threshold. If the interference caused by the uplink transmissions 302 exceeds the interference threshold, the neighboring base station 108 transmits, via its transmitter 206 and antenna 210, an uplink interference indicator to the UAV 106. The UAV 106 receives the uplink interference indicator with antenna 212 and receiver 214. The signal containing the uplink interference indicator is represented in FIG. 3B by signal 304.

In some cases, the neighboring cell 108 transmits the uplink interference indicator to the UAV 106 over a Multicast-Broadcast Single Frequency Network (MBSFN) channel. In other cases, the neighboring cell 108 transmits the uplink interference indicator to the UAV 106 over a System Information Block (SIB). In other examples, the uplink interference indicator also comprises a location of uplink radio resources where the uplink interference occurred.

In some examples, the uplink interference indicator comprises a single threshold indicator comprising one bit. For example, if the neighboring cell 108 is configured to compare the uplink interference with a single interference threshold, the uplink interference indicator could be set to indicate whether the level of uplink interference being experienced by the neighboring cell 108 is above or below the interference threshold.

Upon receipt of the uplink interference indicator, the UAV 106 informs the serving cell 102 of the uplink interference problem. For the example shown in FIG. 3B, the UAV 106 transmits, via transmitter 218 and antenna 212, a feedback indicator to the serving cell 102 to inform the serving cell 102 of the uplink interference problem. The serving cell 102 receives, via its antenna 210 and receiver 208, the feedback indicator. The signal containing the feedback indicator is represented in FIG. 3B by signal 318.

In response to receiving the feedback indicator, the controller 204 of the serving cell 102 determines that the UAV 106 should be configured with a new uplink radio resource. The new uplink radio resource should be an allocation of an uplink radio resource that is different than the uplink radio resource that was utilized when the UAV 106 caused the uplink interference that triggered transmission of the uplink interference indicator and, subsequently, the feedback indicator.

The serving cell 102 transmits, via its transmitter 206 and antenna 210, a new uplink grant to the UAV 106. The new uplink grant specifies the new (e.g., different) uplink radio resource that should be used by the UAV 106. The UAV 106 receives the new uplink grant with antenna 212 and receiver 214. The signal containing the new uplink grant is represented in FIG. 3B by signal 320.

Upon receipt of the new uplink grant, the UAV 106 resumes its uplink transmissions, utilizing the new uplink radio resource specified in the new uplink grant. The UAV 106 transmits, via transmitter 218 and antenna 212, uplink transmissions to the serving cell 102. The serving cell 102 receives the uplink transmissions with its antenna 210 and receiver 208. The signals containing the uplink transmissions are represented in FIG. 3B by signal 322.

Figure 3C:
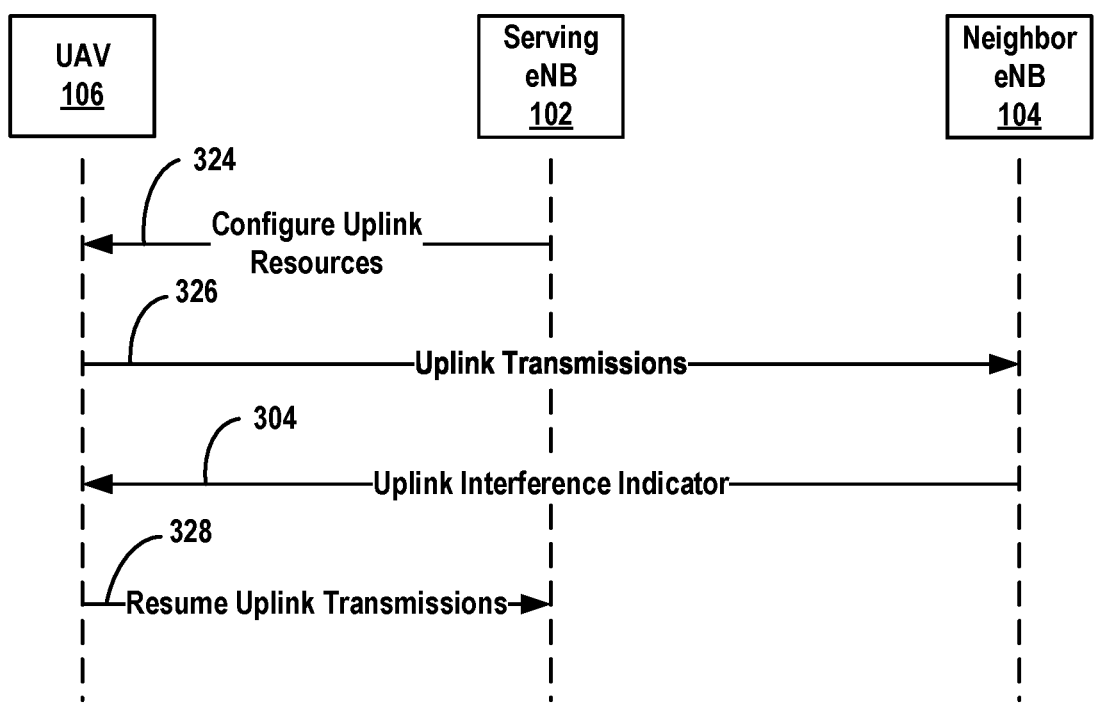
FIG. 3C is a messaging diagram of an example in which a UAV stops using a secondary radio resource in response to causing excessive uplink interference at a neighboring cell.

FIG. 3C is a messaging diagram of an example in which a UAV 106 stops using a secondary radio resource in response to causing excessive uplink interference at a neighboring cell 108. Besides the handover decision and the scheduling decision described above, the uplink interference indicator may also be used for making decisions regarding the use of a secondary resource in a dual connectivity or carrier aggregation scenario. For such a scenario, it is assumed that two uplink radio resources are available (e.g., a primary radio resource and a secondary radio resource) for use by the UAV 106.

The primary radio resource will be a dedicated resource for the UAV 106 that does not interfere with the uplink transmissions of neighboring cells 108, 114. In some cases, the primary uplink radio resource is a dedicated frequency channel, and in other cases, the primary radio resource is a Time Division Duplex (TDD) resource orthogonal to uplink resources used by neighboring cells 108, 114. Typically, the command and control of the UAV 106 will utilize the primary radio resource since the control of the UAV 106 should not be compromised. The command and control of the UAV 106 does not usually require a large amount of uplink resource. Thus, a narrowband channel will be sufficient for communications associated with the command and control of the UAV 106.

However, uplink video transmissions from the UAV 106 will utilize the secondary radio resource. Unlike the primary radio resource, the uplink transmissions from the UAV 106 on the secondary radio resource may interfere with the neighboring cells 108, 114. In order to support the transmission of video from the UAV 106, the secondary radio resource typically has a much larger bandwidth pipe than the primary radio resource.

When the neighboring cell 108 experiences excessive uplink interference on the secondary radio resource, the neighboring cell 108 will send an uplink interference indicator to the UAV 106. After receiving the uplink interference indicator, the UAV 106 will temporarily stop using the secondary radio resource and stop the video transmissions. In some examples, the secondary radio resource may be allocated for device-to-device (D2D) communication whereby multiple UE devices and/or UAVs may use the same resource. In other examples, the UAV 106 may be configured to incorporate energy-detection or listen-before-talk on the secondary radio resource to reduce the likelihood of collision among transmissions from other UAVs using the same resource. FIG. 3C depicts the messages that are exchanged between the UAV 106 and the base stations 102, 108 so that the UAV 106 can make an informed decision regarding the use of a secondary resource in a dual connectivity or carrier aggregation scenario.

The serving cell 102 transmits, via its transmitter 206 and antenna 210, an uplink resource configuration to the UAV 106. The uplink resource configuration specifies the primary and secondary radio resources that should be used by the UAV 106. The UAV 106 receives the uplink resource configuration with antenna 212 and receiver 214. The signal containing the uplink resource configuration is represented in FIG. 3C by signal 324.

The UAV 106 transmits uplink data using the configured primary and secondary radio resources. For example, the UAV 106 transmits, via transmitter 218 and antenna 212, the video as an uplink transmission that is intended for the serving cell (e.g., base station) 102. However, at least some of these uplink transmissions create unintended interference at neighboring cell (e.g., base station) 108. The base stations 102, 108 receive the uplink transmissions via their respective antennas 210 and receivers 208. The signal containing the uplink transmissions is represented in FIG. 3C by signal 326.

Upon receipt of the uplink transmissions 326 from the UAV 106, the controller 204 of neighboring base station 108 determines whether the uplink transmissions 326 received from the UAV 106 are causing a level of interference at the neighboring cell 108 that exceeds an interference threshold. If the interference caused by the uplink transmissions 326 exceeds the interference threshold, the neighboring base station 108 transmits, via its transmitter 206 and antenna 210, an uplink interference indicator to the UAV 106. The UAV 106 receives the uplink interference indicator with antenna 212 and receiver 214. The signal containing the uplink interference indicator is represented in FIG. 3C by signal 304.

In some examples, the uplink interference indicator comprises a single threshold indicator comprising one bit. For example, if the neighboring cell 108 is configured to compare the uplink interference with a single interference threshold, the uplink interference indicator could be set to indicate whether the level of uplink interference being experienced by the neighboring cell 108 is above or below the interference threshold. In other examples, the uplink interference indicator also comprises a time window to facilitate determination of which UAV 106 caused the uplink interference at the neighboring cell 108. In still other examples, the uplink interference indicator also comprises a location of uplink radio resources where the uplink interference occurred.

Upon receipt of the uplink interference indicator, the UAV 106 refrains from transmitting on at least a portion of the uplink radio resources that have been assigned to the UAV 106 for uplink transmissions. In some examples, the UAV 106 temporarily stops transmitting video on the secondary radio resource. For examples in which the uplink interference occurs within a shared secondary radio resource, the UAV 106 temporarily stops transmitting video on the shared secondary radio resource.

After a period of time, the UAV 106 resumes transmission on the uplink radio resources. In some cases, the period of time is based on expiration of a timer. Before resuming transmission on the uplink radio resources, the UAV 106 has the option of selecting a different subset of the secondary uplink radio resource to use when transmitting is resumed.

The UAV 106 resumes its uplink transmissions, via transmitter 218 and antenna 212, to the serving cell 102. The serving cell 102 receives the uplink transmissions with its antenna 210 and receiver 208. The signals containing the uplink transmissions are represented in FIG. 3C by signal 328.

Figure 3D:
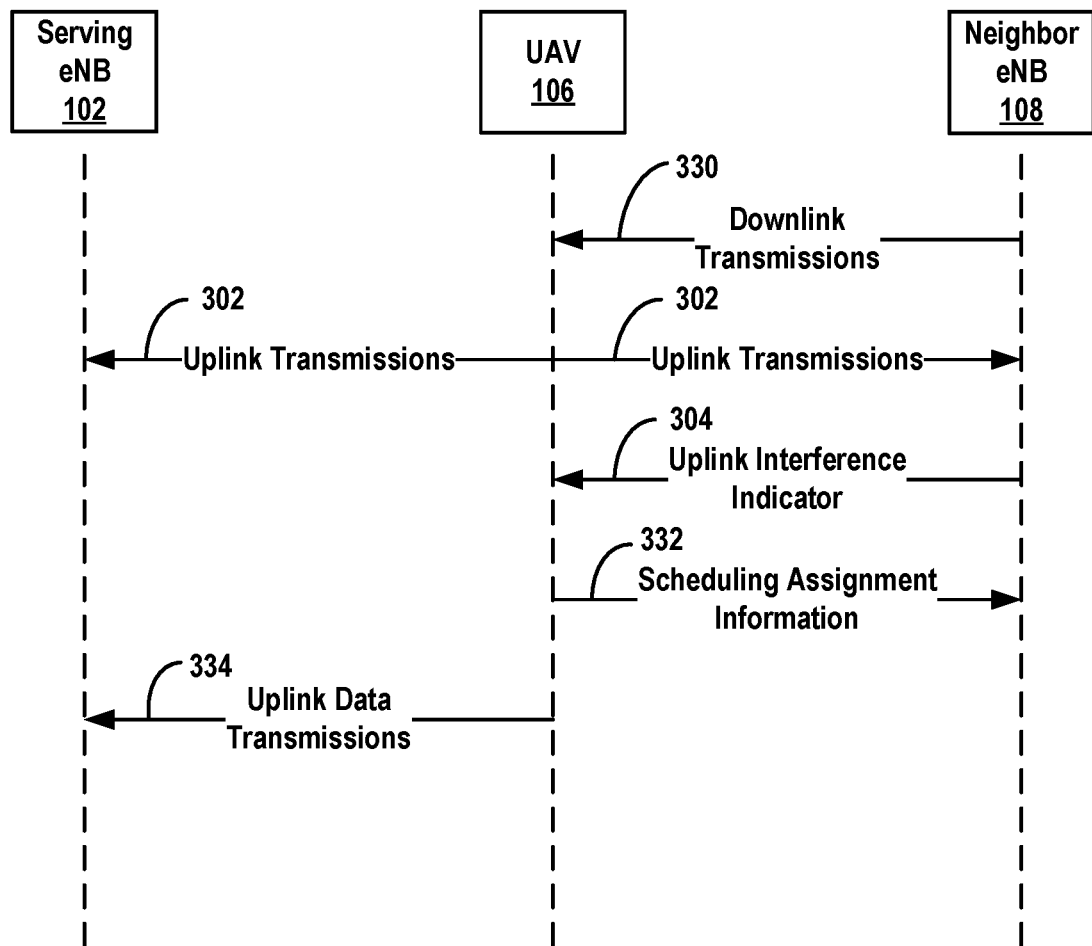
FIG. 3D is a messaging diagram of an example in which a UAV selects which System Information Block (SIB) messages to monitor based on the signal strength of downlink signals received at the UAV from the neighboring cells.

FIG. 3D is a messaging diagram of an example in which a UAV 106 selects which System Information Block (SIB) messages to monitor based on the signal strength of downlink signals received at the UAV 106 from the neighboring cells 108, 114. As mentioned above, the neighboring cell 108 can send the uplink interference indicator using an SIB message. However, in order to receive the uplink interference indicator, the UAV 106 has to monitor a large number of SIB messages transmitted by the neighboring cells 108, 114. The UAV 106 does not know beforehand whether a particular neighboring cell is the victim of interference caused by uplink transmissions from the UAV 106. Monitoring a large number of downlink SIB messages is very inefficient as it takes a large amount of time for the UAV 106 to read each SIB message, which leads to additional complexities and higher power consumption.

In order to down-select to a smaller number of SIB messages, the UAV 106 could choose to read the SIB messages from only those neighboring base stations that have a downlink signal strength (e.g., Reference Signals Received Power (RSRP)) greater than a certain signal strength threshold measured at the UAV 106. This signal strength threshold could be defined by the network. In Frequency Division Duplex (FDD) deployments, the UAV 106 could assume that a neighboring base station 108 is receiving the uplink signal from the UAV 106 at a strength that is similar to the strength at which the UAV 106 is receiving the downlink signal from the same neighboring base station 108. In a TDD deployment, a simple downlink-uplink reciprocity is applied to determine the strength at which signals are being received between the UAV 106 and the neighboring base station 108.

On the other hand, the neighboring base station 108 performs uplink measurements to detect uplink interference from the uplink transmissions from the UAV 106. If the uplink signal received at the neighboring base station 108 is higher than a certain threshold and the neighboring base station 108 is unable to tolerate such interference, then the neighboring cell 108 could decide to transmit the uplink interference indicator via an SIB message. Once the interference from the UAV 106 is sufficiently reduced or becomes tolerable at the neighboring base station 108, the neighboring cell 108 has the option to remove the uplink interference indicator from its SIB messaging.

For the example shown in FIG. 3D, the UAV 106 would only transmit the Sounding Reference Signal (SRS), including scheduling assignment information for the UAV 106, if the uplink interference indicator is present in one of the SIB messages that the UAV 106 is monitoring, based on the downlink signal strength threshold. In other examples, the UAV 106 would transmit a signal on the PRACH instead of an SRS. Since the uplink resources of the UAV 106 are typically allocated semi-persistently, the UAV 106 should also inform the neighboring base stations 108, 114 when the scheduled uplink transmissions are stopped.

As described above, the UAV 106 monitors/reads the SIB messages, and the neighboring base station 108 measures the uplink transmissions before transmitting the uplink interference indicator. Both of these tasks are performed in parallel and can be done as on-going background processes.

In some cases, the neighboring cell 108 already has a heavy traffic load within its own cell, or the interference may be coming from other UAVs, and as a result, the Interference-over-Thermal (IoT) level has reached an intolerable level. In these cases, the neighboring cell 108 may not have to wait for the uplink transmissions from the UAV 106 and can simply transmit the uplink interference indicator via SIB messaging.

FIG. 3D depicts the messages that are exchanged between the UAV 106 and the base stations 102, 108 so that the UAV 106 can select which System Information Block (SIB) messages to monitor based on the signal strength of downlink signals received at the UAV 106 from the neighboring cells 108, 114.

The neighboring base station 108 transmits, via its transmitter 206 and antenna 210, downlink signals to the UAV 106. The UAV 106 receives the downlink signals with antenna 212 and receiver 214. The downlink signals are represented in FIG. 3D by signal 330.

Upon receipt of the downlink signals 330, the controller 216 of the UAV 106 measures the signal strength of the received downlink signals 330. In some examples, signal strength is an RSRP value. However, any other suitable signal strength/signal power values can be used. If the signal strength of the downlink signals 330 received at the UAV 106 from the neighboring cell 108 exceeds a signal strength/signal power threshold, the UAV 106 will begin monitoring System Information Block (SIB) messaging from the neighboring cell 108 that transmitted the downlink signals 330.

While the UAV 106 monitors the SIB messaging from the neighboring cell 108, the neighboring cell 108 will also measure the uplink transmissions from the UAV 106. The uplink transmissions are represented in FIG. 3D by signal 302. The controller 204 of neighboring base station 108 determines whether the uplink transmissions 302 received from the UAV 106 are causing a level of interference at the neighboring cell 108 that exceeds an interference threshold. If the interference caused by the uplink transmissions 302 exceeds the interference threshold, the neighboring base station 108 transmits, via its transmitter 206 and antenna 210, an uplink interference indicator to the UAV 106 in a SIB message. The UAV 106 receives the uplink interference indicator with antenna 212 and receiver 214. The signal containing the uplink interference indicator is represented in FIG. 3D by signal 304.

Upon receipt of the uplink interference indicator, the UAV 106 transmits a Sounding Reference Signal (SRS), including the scheduling assignment information for the UAV 106, to the neighboring base station 108 that sent the uplink interference indicator. The signal containing the scheduling assignment information is represented in FIG. 3D by signal 332. As mentioned above, in other examples, the UAV 106 would transmit a signal on the PRACH instead of an SRS.

Upon receipt of the scheduling assignment information, the neighboring cell 108 takes steps to mitigate the uplink interference from the UAV 106, such as beam steering or rescheduling uplink transmissions from other UE devices and/or UAVs being served by neighboring base station 108, based on the scheduling assignment information received from the UAV 106. Meanwhile, UAV 106 continues to transmit its uplink transmissions to the serving cell 102. These uplink transmissions are represented in FIG. 3D by signal 334.

Figure 4A:
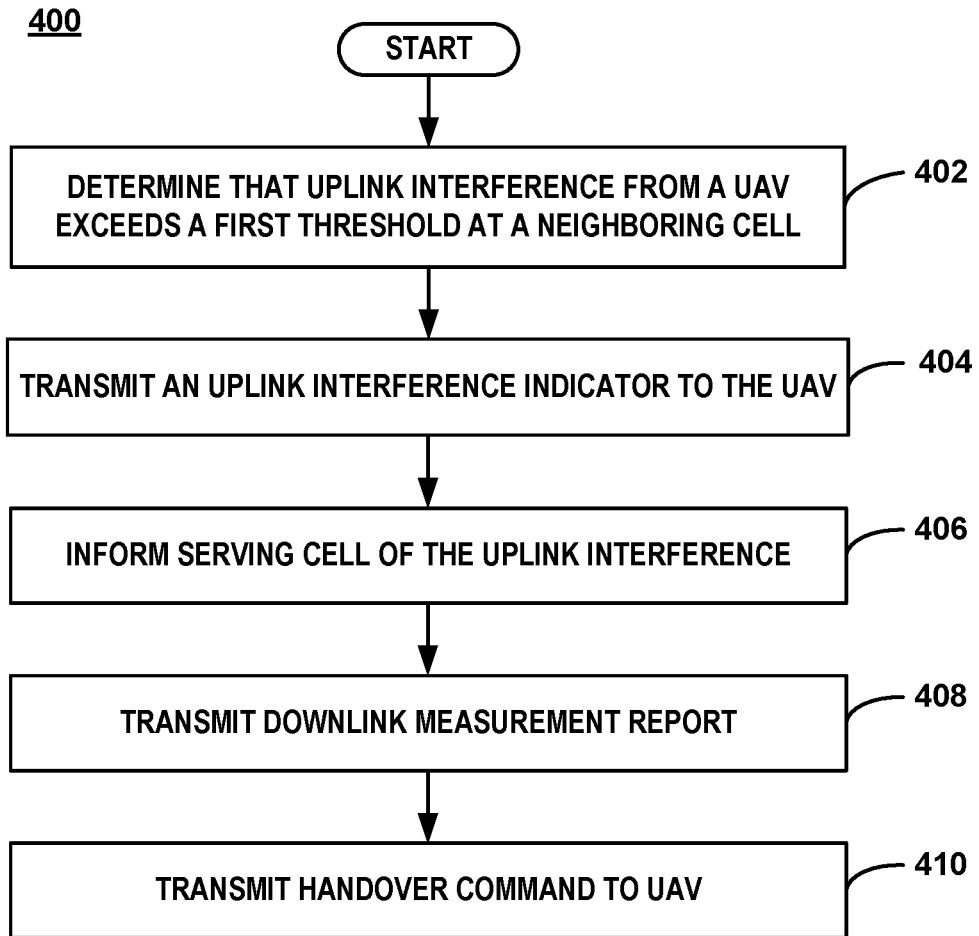
FIG. 4A is a flowchart of an example of a method in which a serving cell makes a handover decision for the UAV in response to the UAV causing excessive uplink interference at a neighboring cell.

FIG. 4A is a flowchart of an example of a method in which a serving cell 102 makes a handover decision for the UAV 106 in response to the UAV 106 causing excessive uplink interference at a neighboring cell 108. The steps of method 400 may be performed in a different order than described herein and shown in the example of FIG. 4A. Furthermore, in some examples, one or more of the steps may be omitted. Moreover, in other examples, one or more additional steps may be added. In some cases, multiple steps may be performed in parallel.

In the example shown in FIG. 4A, the method 400 begins at step 402, in which it is determined that uplink interference from UAV 106 exceeds an interference threshold at a neighboring cell 108. At step 404, the neighboring base station 108 transmits an uplink interference indicator to the UAV 106. At step 406, the UAV 106 informs the serving cell 102 of the uplink interference experienced by neighboring cell 108. In some cases, the UAV 106 transmits a neighboring cell identifier associated with the neighboring cell 108 to the serving cell 102.

At step 408, the UAV 106 transmits a downlink measurement report associated with the neighboring cell 108 to the serving cell 102. The serving cell 102 uses the information received from the UAV 106 to make a handover decision on behalf of the UAV 106. At step 410, the serving cell 102 transmits a handover command instructing the UAV 106 to perform a handover procedure to the neighboring cell 108.

Figure 4B:
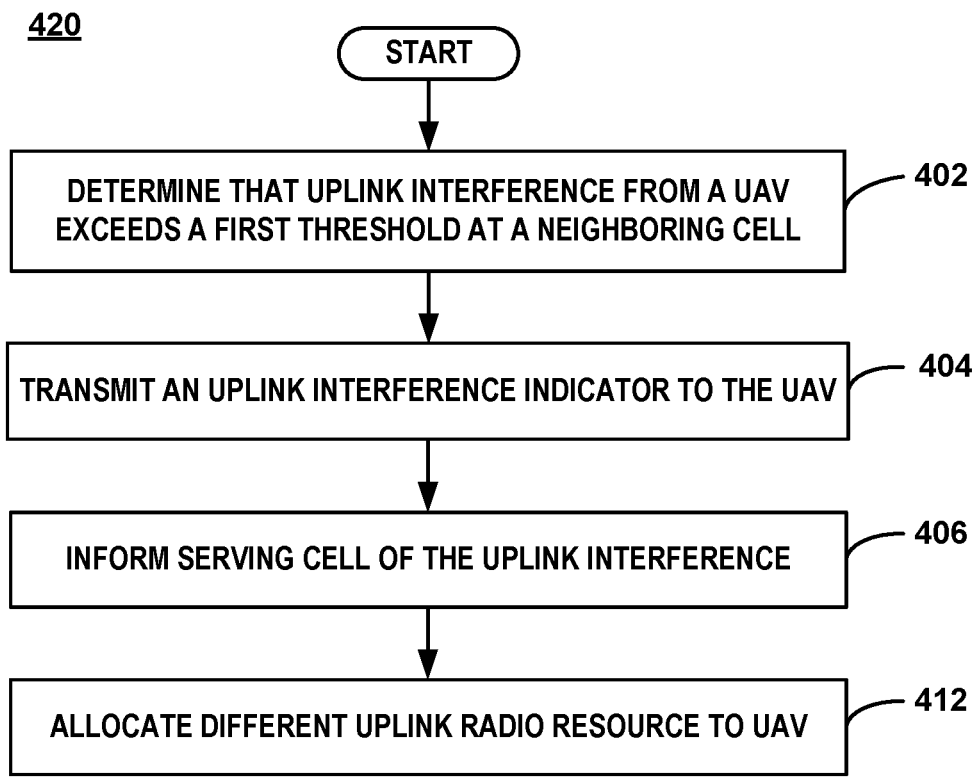
FIG. 4B is a flowchart of an example of a method in which a serving cell makes a scheduling decision for the UAV in response to the UAV causing excessive uplink interference at a neighboring cell.

FIG. 4B is a flowchart of an example of a method in which a serving cell 102 makes a scheduling decision for the UAV 106 in response to the UAV 106 causing excessive uplink interference at a neighboring cell 108. The steps of method 420 may be performed in a different order than described herein and shown in the example of FIG. 4B. Furthermore, in some examples, one or more of the steps may be omitted. Moreover, in other examples, one or more additional steps may be added. In some cases, multiple steps may be performed in parallel.

In the example shown in FIG. 4B, the method 420 begins at step 402, in which it is determined that uplink interference from UAV 106 exceeds an interference threshold at a neighboring cell 108. At step 404, the neighboring base station 108 transmits an uplink interference indicator to the UAV 106. At step 406, the UAV 106 informs the serving cell 102 of the uplink interference experienced by neighboring cell 108. At step 412, the serving cell 102 allocates a different uplink radio resource to the UAV 106 to use for uplink data transmissions.

Figure 4C:
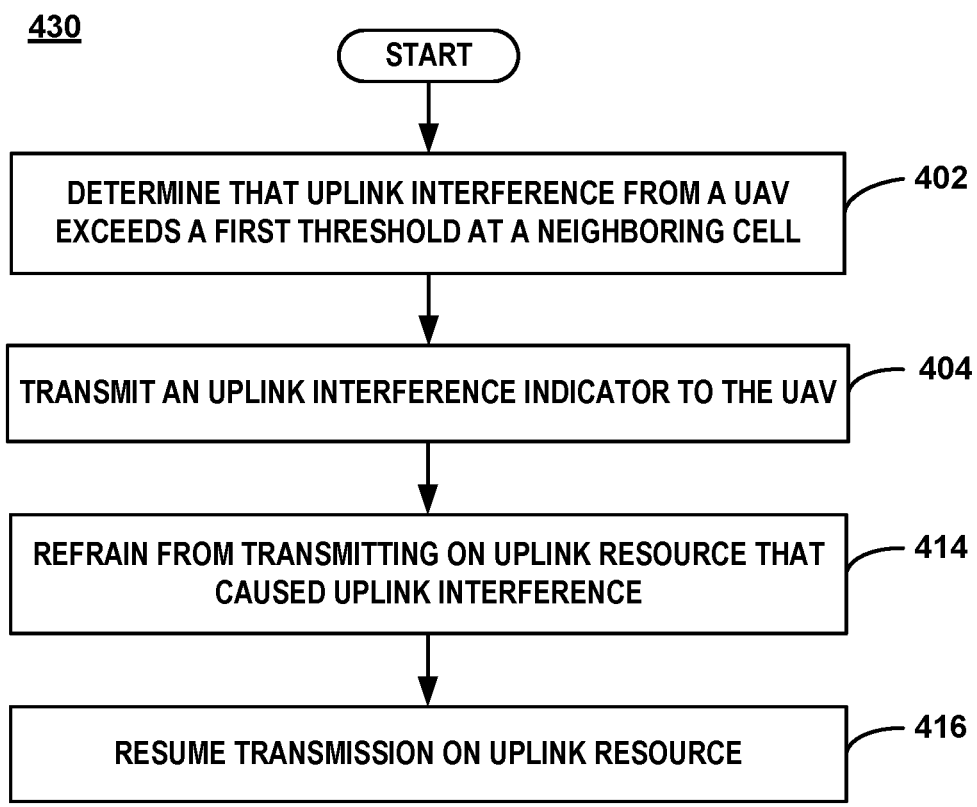
FIG. 4C is a flowchart of an example of a method in which a UAV stops using a secondary radio resource in response to causing excessive uplink interference at a neighboring cell.

FIG. 4C is a flowchart of an example of a method in which a UAV 106 stops using a secondary radio resource in response to causing excessive uplink interference at a neighboring cell 108. The steps of method 430 may be performed in a different order than described herein and shown in the example of FIG. 4C. Furthermore, in some examples, one or more of the steps may be omitted. Moreover, in other examples, one or more additional steps may be added. In some cases, multiple steps may be performed in parallel.

In the example shown in FIG. 4C, the method 430 begins at step 402, in which it is determined that uplink interference from UAV 106 exceeds an interference threshold at a neighboring cell 108. At step 404, the neighboring base station 108 transmits an uplink interference indicator to the UAV 106. At step 414, the UAV 106 refrains from transmitting on the uplink resource on which the UAV 106 was transmitting that caused the uplink interference experienced by neighboring cell 108. In some cases, the UAV 106 stops transmitting on a secondary radio resource. After a period of time, which may be indicated by the expiration of a timer, the UAV 106 resumes uplink transmissions, at step 416. In some cases, the UAV 106 resumes uplink data transmissions using a different uplink resource than the uplink resource that was being used when the neighboring cell 108 experienced excessive uplink interference.

Figure 4D:
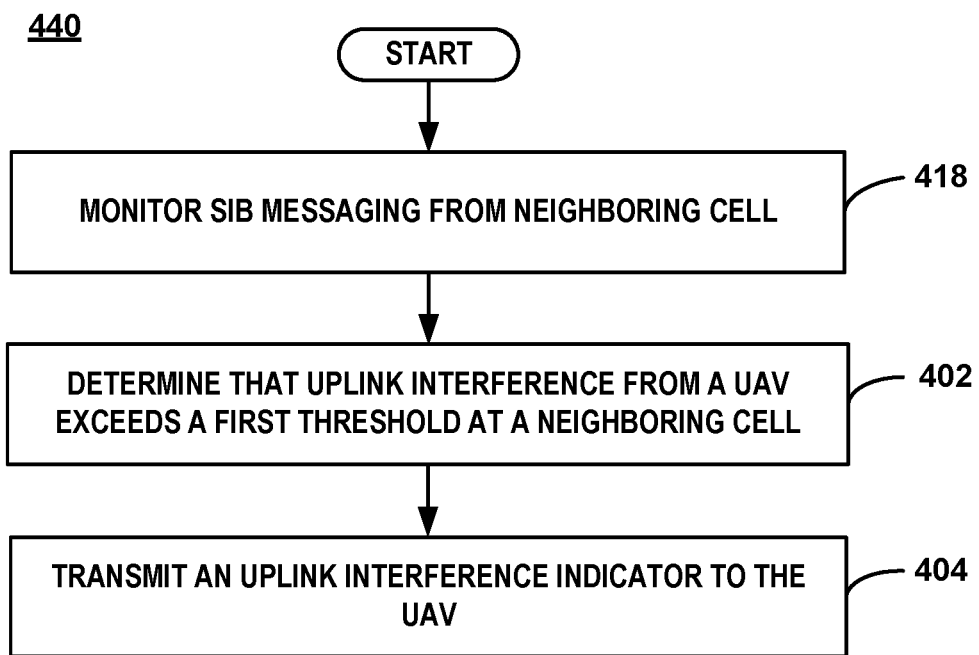
FIG. 4D is a flowchart of an example of a method in which a UAV selects which System Information Block (SIB) messages to monitor based on the signal strength of downlink signals received at the UAV from the neighboring cells.

FIG. 4D is a flowchart of an example of a method in which a UAV 106 selects which System Information Block (SIB) messages to monitor based on the signal strength of downlink signals received at the UAV 106 from the neighboring cells 108, 114. The steps of method 440 may be performed in a different order than described herein and shown in the example of FIG. 4D. Furthermore, in some examples, one or more of the steps may be omitted. Moreover, in other examples, one or more additional steps may be added. In some cases, multiple steps may be performed in parallel.

In the example shown in FIG. 4D, the method 440 begins at step 418 with UAV 106 monitoring SIB messages from one or more neighboring cells 108, 114 whose downlink signals exceed a received signal strength/signal power threshold measured at the UAV 106. At step 402, it is determined that uplink interference from UAV 106 exceeds an interference threshold at a neighboring cell 108. At step 404, the neighboring base station 108 transmits an uplink interference indicator to the UAV 106. In some cases, the UAV 106 transmits its scheduling assignment information in an SRS signal to the neighboring cell 108 that transmitted the uplink interference indicator so the neighboring cell 108 can mitigate the uplink interference.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   informing a serving cell of uplink interference experienced by a neighboring cell;
   in response to an unmanned aerial vehicle (UAV) detecting the uplink interference with the neighboring cell, transmitting a downlink measurement report to the serving cell, the downlink measurement report associated with downlink transmissions received by the UAV from the neighboring cell, the downlink measurement report including an identifier of the neighboring cell.

2. The method of claim 1, wherein informing the serving cell of the uplink interference experienced by the neighboring cell comprises:
   transmitting an uplink interference indicator to the serving cell.

3. The method of claim 1, further comprising:
   transmitting a handover command to the UAV.

4. The method of claim 3, wherein the handover command is based on:
   the identifier of the neighboring cell that experienced the uplink interference, and
   a downlink measurement report received from the UAV.

5. The method of claim 1, further comprising:
allocating a different uplink radio resource to the UAV.

6. A wireless communication device (WCD) capable of flight without having a human pilot aboard, the wireless communication device comprising
- a transmitter configured to: inform a serving cell of uplink interference experienced by a neighboring cell; and
- in response to detecting the uplink interference with the neighboring cell, transmit a downlink measurement report to the serving cell, the downlink measurement report associated with downlink transmissions received by the UAV from the neighboring cell, the downlink measurement report including an identifier of the neighboring cell.

7. An apparatus for controlling a wireless communication device (WCD) capable of flight without having a human pilot aboard, the apparatus configured to perform processing of:
- informing a serving cell of uplink interference experienced by a neighboring cell; and
- in response to detecting the uplink interference with the neighboring cell, transmitting a downlink measurement report to the serving cell, the downlink measurement report associated with downlink transmissions received by the UAV from the neighboring cell, the downlink measurement report including an identifier of the neighboring cell.

* * * * *